United States Patent
Aoki (10) Patent No.: US 12,361,728 B2
(45) Date of Patent: Jul. 15, 2025

(54) VEHICLE DISPLAY DEVICE

(71) Applicant: YAZAKI CORPORATION, Tokyo (JP)

(72) Inventor: Kunimitsu Aoki, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 10 days.

(21) Appl. No.: 18/624,067

(22) Filed: Apr. 1, 2024

(65) Prior Publication Data

US 2024/0249537 A1    Jul. 25, 2024

Related U.S. Application Data (63) Continuation of application No. PCT/JP2022/047029, filed on Dec. 21, 2022.

(30) Foreign Application Priority Data

Jan. 18, 2022   (JP) .................... 2022-005518

(51) Int. Cl.
*G06K 9/00*    (2022.01)
*G02B 5/30*    (2006.01)
(Continued)

(52) U.S. Cl.
CPC ......... *G06V 20/597* (2022.01); *G02B 5/3016* (2013.01); *G02B 26/06* (2013.01);
(Continued)

(58) Field of Classification Search
CPC .... G06V 20/597; G06V 10/14; G02B 5/3016; G02B 26/06; G02B 27/28; G02B 27/01;
(Continued)

(56) References Cited

U.S. PATENT DOCUMENTS

| | | | |
|---|---|---|---|
| 8,213,782 B2 * | 7/2012 | Jelinek ................... | G03B 13/36 396/153 |
| 10,013,609 B2 * | 7/2018 | Ono ..................... | H04N 23/611 |

(Continued)

FOREIGN PATENT DOCUMENTS

| | | | | |
|---|---|---|---|---|
| CN | 110388881 A | * | 10/2019 | ............. G01B 11/24 |
| JP | 6941799 B2 | * | 9/2021 | ............... B60R 1/02 |

(Continued)

*Primary Examiner* — Philip P. Dang
(74) *Attorney, Agent, or Firm* — KENEALY VAIDYA LLP

(57) ABSTRACT

A vehicle display device that can easily determine the driver's state of wearing polarized sunglasses is provided. A vehicle display device includes a polarizer that is disposed in front of a lens of a camera that continuously acquires face images of a driver P so that a polarization direction becomes a horizontal direction that is orthogonal to a vertical direction. In the vehicle display device, a control unit calculates a luminance value corresponding to each face image, and causes a storage unit to store the calculated luminance values therein as the luminance value information in association with a time series. The control unit then compares the current luminance value information with the past luminance value information in a plurality of pieces of luminance value information stored in the storage unit and when the current luminance value information decreases, determines that the driver puts on the polarized sunglasses.

8 Claims, 10 Drawing Sheets

(51) Int. Cl.
  *G02B 26/06* (2006.01)
  *G02B 27/28* (2006.01)
  *G06V 10/14* (2022.01)
  *G06V 20/59* (2022.01)
  *H04N 7/18* (2006.01)
  *B60K 35/234* (2024.01)

(52) U.S. Cl.
  CPC ............ *G02B 27/28* (2013.01); *G06V 10/14* (2022.01); *B60K 35/234* (2024.01); *B60K 2360/21* (2024.01); *B60K 2360/25* (2024.01); *B60K 2360/349* (2024.01)

(58) Field of Classification Search
  CPC .... G08G 1/16; B60K 35/234; B60K 2360/21; B60K 2360/25; B60K 2360/349; B60R 11/04; B60W 40/08; G01N 21/21; G03B 7/091; G03B 11/00; G03B 15/00; G06T 7/00; H04N 23/55; H04N 23/611
  See application file for complete search history.

(56) References Cited

U.S. PATENT DOCUMENTS

| | | | | |
|---|---|---|---|---|
| 2002/0136435 A1* | 9/2002 | Prokoski | ............... | G06V 40/45 382/118 |
| 2003/0012425 A1* | 1/2003 | Suzuki | ............... | G02B 27/0093 348/E13.05 |
| 2003/0123711 A1* | 7/2003 | Kim | ............... | G06V 40/18 382/117 |
| 2003/0174211 A1* | 9/2003 | Imaoka | ............... | H04M 1/67 382/117 |
| 2008/0037835 A1* | 2/2008 | Lee | ............... | G06V 40/19 382/117 |
| 2009/0016574 A1* | 1/2009 | Tsukahara | ............... | A61B 5/117 382/117 |
| 2010/0091285 A1* | 4/2010 | Newcomb | ............... | G01N 21/9027 356/408 |
| 2011/0052009 A1* | 3/2011 | Berkovich | ............... | G02B 27/01 382/106 |
| 2012/0230545 A1* | 9/2012 | Zhang | ............... | G06V 10/945 382/103 |
| 2012/0293629 A1* | 11/2012 | Min | ............... | G06V 40/19 348/46 |
| 2013/0222564 A1* | 8/2013 | Park | ............... | H04N 23/611 348/77 |
| 2013/0243274 A1* | 9/2013 | Sukegawa | ............... | G06V 40/16 382/118 |
| 2013/0329079 A1* | 12/2013 | Florea | ............... | H04N 5/2621 348/222.1 |
| 2014/0099005 A1* | 4/2014 | Mogi | ............... | G06V 40/172 382/118 |
| 2015/0379348 A1* | 12/2015 | Whritenor | ............... | G06V 40/193 382/117 |
| 2016/0117554 A1* | 4/2016 | Kang | ............... | G06V 40/19 348/78 |

FOREIGN PATENT DOCUMENTS

| | | | | |
|---|---|---|---|---|
| JP | 7020023 B2 * | 2/2022 | | |
| WO | WO-2018070064 A1 * | 4/2018 | ............ | B60K 28/06 |
| WO | 2020/194853 A1 | 10/2020 | | |

* cited by examiner

VEHICLE DISPLAY DEVICE

CROSS-REFERENCE TO RELATED APPLICATION

This application is a continuation application of International Application No. PCT/JP2022/047029 filed on Dec. 21, 2022 which claims the benefit of priority from Japanese Patent Application No. 2022-005518 filed on Jan. 18, 2022 and designating the U.S., the entire contents of which are incorporated herein by reference.

BACKGROUND OF THE INVENTION

1. Field of the Invention

The present invention relates to a vehicle display device.

2. Description of the Related Art

When a driver wearing polarized sunglasses drives a vehicle in which a vehicle display device, such as a head-up display (HUD), is mounted, the driver may find it difficult to see a virtual image (display image) displayed ahead of the vehicle (see, for example, WO2020/194853).

By the way, once it becomes clear that the driver wears polarized sunglasses, it is possible to increase the visibility of the display image by, for example, increasing the luminance of the display image or changing the polarization angle of the display light. Therefore, it is necessary to detect whether the driver wears polarized sunglasses.

SUMMARY OF THE INVENTION

It is an object of the present invention to provide a vehicle display device that can easily determine a driver's state of wearing polarized sunglasses.

In order to achieve the above mentioned object, a vehicle display device according to one aspect of the present invention includes: a camera that continuously acquires face images including a face of a driver of a vehicle; a polarizer that is disposed in front of a lens of the camera, converts incident light into linearly polarized light, and emits the light toward the camera; and a control unit that determines whether the driver wears polarized sunglasses, based on the acquired face images, wherein the polarizer is disposed so that a polarization direction becomes a horizontal direction that is orthogonal to a vertical direction, the control unit includes a calculation unit that calculates a luminance value corresponding to each of the face images and causes a storage unit to store therein, the calculated luminance value in association with a time series as luminance value information, and a determination unit that compares current luminance value information with past luminance value information in a plurality of pieces of luminance value information stored in the storage unit, and when the current luminance value information decreases, determines the driver puts on the polarized sunglasses, and the control unit outputs a result of the determination to outside.

DETAILED DESCRIPTION OF THE PREFERRED EMBODIMENTS

Vehicle display devices according to embodiments of the present invention are hereinafter described in detail with reference to the drawings. Note that the embodiments given below do not limit the present invention. In other words, the components in the following embodiments include the components that can be readily conceived by people skilled in the art or that are substantially the same, and various omissions, substitutions, and changes can be made to the extent that they do not depart from the gist of the invention.

First Embodiment

Figure 1:
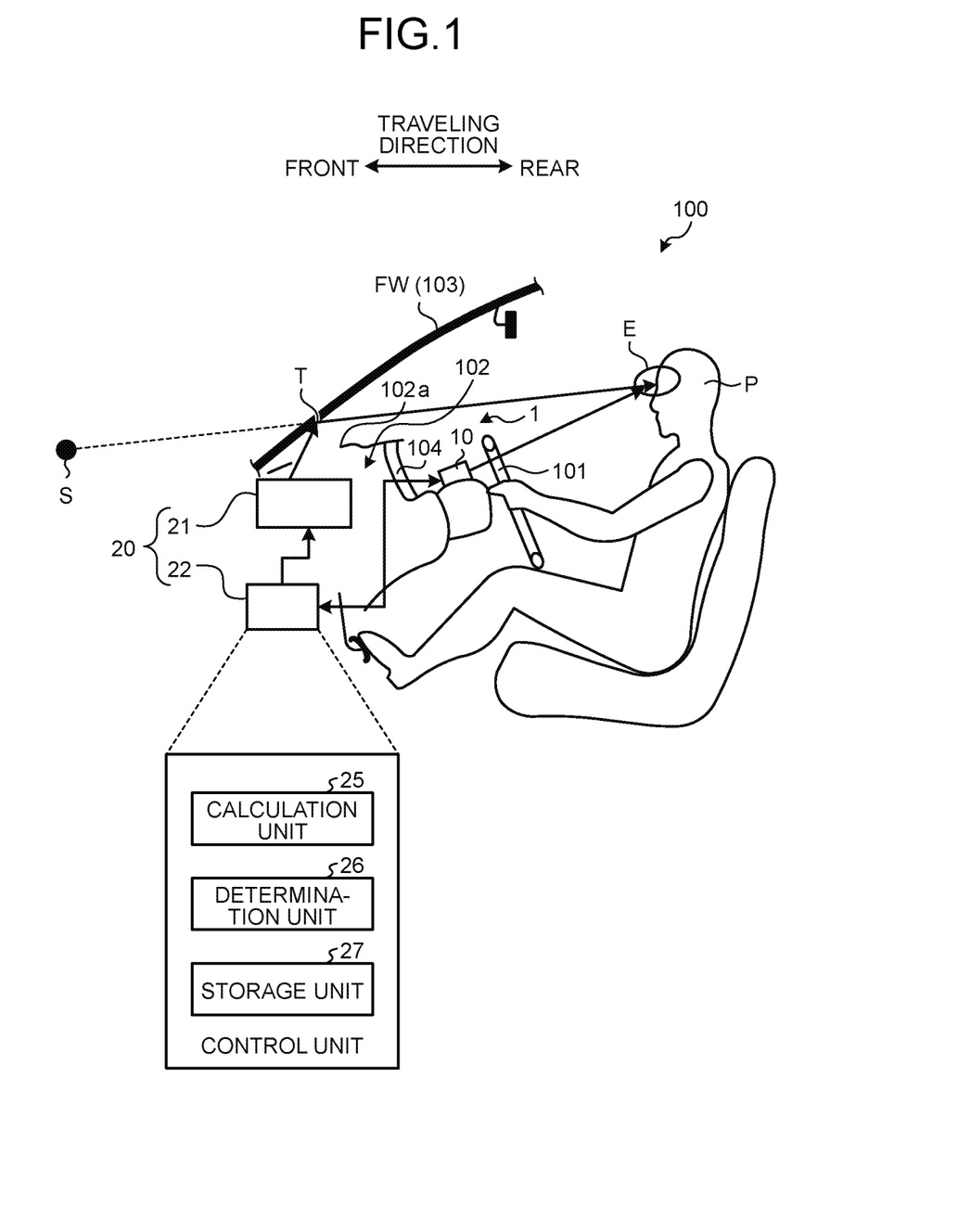
FIG. 1 is a schematic diagram illustrating an example of application of a vehicle display device according to a first embodiment to a vehicle.

A vehicle display device according to this embodiment is described with reference to FIG. 1 to FIG. 5. A vehicle display device 1 is disposed in a vehicle 100, such as an automobile, as illustrated in FIG. 1. In the vehicle 100, a steering wheel 101 is disposed in front of a driver P, an instrument panel 102 is disposed in front of the steering wheel 101, and a front windshield FW is disposed in front of the instrument panel 102. The instrument panel 102 is a member that separates the front cabin space of the vehicle 100 and is a place where an instrument 104 such as a speedometer is disposed. The instrument panel 102 includes an opening part 102a through which display light to be projected from an HUD unit 20, which is described below, passes. The front windshield FW forms the boundary between the inside and outside of the vehicle 100 and transmits the scenery ahead of the vehicle 100 in a traveling direction.

Figure 2:
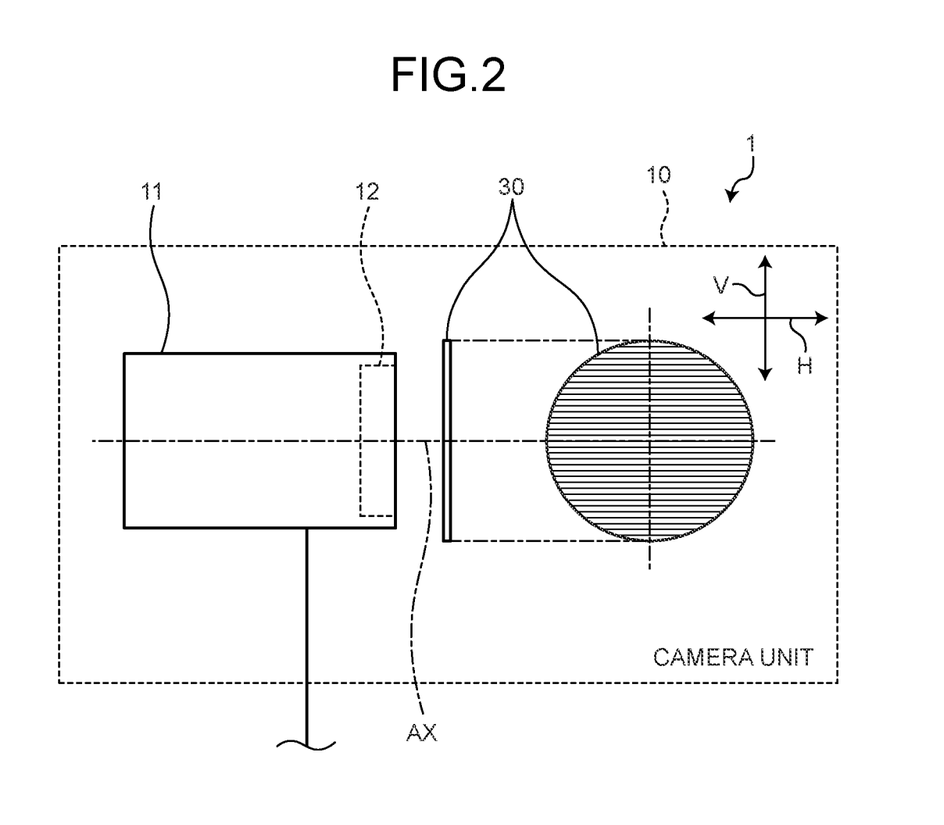
FIG. 2 is a block diagram illustrating an example of a structure of the vehicle display device according to the first embodiment.

The vehicle display device 1 includes a camera unit 10 and the HUD unit 20. The camera unit 10 detects the visual line of the driver P. The camera unit 10 is provided on the instrument panel 102 of the vehicle 100 and faces the driver P. The camera unit 10 includes a camera 11 and a polarizer 30 as illustrated in FIG. 2.

The camera 11 is an example of a photographing unit, and photographs a face region including the face of the driver P and acquires the photographed face images continuously. The camera 11 has a lens 12, and the lens 12 is directed toward the face of the driver P. The camera 11 is activated when an accessory (ACC) or ignition (IG) power of the vehicle 100 is turned on, and photographs the face images of the driver P until these power sources are turned off. The camera 11 acquires still images or moving images (hereinafter simply referred to as "images"). The camera 11 outputs the photographed face images to a control unit 22.

The polarizer 30 is an optical element that has the property of transmitting only light oscillating in only one direction and blocking light oscillating in the other directions. Polarizers are generally used in optical filters used for photography, polarized sunglasses, and the like because they can cut off glaring sunlight reflected on water and road surfaces. The polarizer 30 in this embodiment is disposed in front of the lens 12 of the camera 11, converts the incident light to linearly polarized light, and emits the light toward the camera 11. The polarizer 30 is disposed on the opposite side of the lens 12 in an optical axis direction AX of the lens 12. Although the polarizer 30 is disposed with a gap from the lens 12 in the illustrated example, the arrangement is not limited to this and the polarizer 30 may be disposed without a gap from the lens 12. The polarizer 30 in this embodiment is disposed so that the polarization direction becomes a horizontal direction that is orthogonal to a vertical direction.

The HUD unit 20 enables viewing of the scenery ahead of the vehicle 100 through the front windshield FW and at the same time, viewing of display information contained in the display light reflected on a projection object 103, such as the front windshield FW, as a virtual image S. The display information includes, for example, information about the vehicle 100, such as vehicle speed information, navigation information, shift position information, and air conditioner setting information. The HUD unit 20 projects the display light containing the display information onto the front windshield FW and forms an optical path so that the display light reflected on the front windshield FW is directed toward the driver P's viewpoint. The driver P sees the display information displayed on the front windshield FW as the virtual image S while viewing the scenery ahead of the vehicle 100 through the front windshield FW. The HUD unit 20 is provided in the instrument panel 102 and includes a projection unit 21 and the control unit 22.

The projection unit 21 projects the display light containing the display information onto the front windshield FW that transmits light. The projection unit 21 has a display area T for displaying the display information, with the display area T located above an upper end of the steering wheel 101 of the vehicle 100 in the vertical direction. The projection unit 21 includes a display unit and an aspherical mirror that are not illustrated. The display unit emits the display light containing the display information. The display unit includes a liquid crystal panel, which is not illustrated, that displays the display information, a backlight, which is not illustrated, that is provided on a rear surface of the liquid crystal panel, and the like. The display unit emits the display light from the liquid crystal panel when illuminated by the backlight. The aspherical mirror has optical characteristics to form the virtual image S in a position at a predetermined distance. The aspherical mirror is provided facing the display unit and is supported in such a way that the tilt relative to the front windshield FW is adjustable. The aspherical mirror reflects the display light emitted from the display unit and projects the display light toward the front windshield FW through the opening part 102a in the instrument panel 102. The display light projected from the aspherical mirror is reflected on the front windshield FW and reaches an eye point E of the driver P. This allows the driver P to see the virtual image S formed ahead of the front windshield FW in the overall length direction of the vehicle 100.

The control unit 22 controls the camera unit 10 and the projection unit 21, and is mainly composed of a microprocessor, which is not illustrated, including, for example, an arithmetic processing device including a CPU or the like, a ROM, a RAM, and the like. The control unit 22 adjusts the tilt of the aspherical mirror with respect to the front windshield FW and displays the virtual image S as the display information in the display area T. With the display information displayed on the liquid crystal panel, the control unit 22 emits the display light, which illuminates the backlight from the rear surface of the liquid crystal panel and contains the display information, toward the aspherical mirror.

The control unit 22 has a visual line detection function of detecting the driver P's visual line, based on the face image. The control unit 22 detects the driver P's visual line on the basis of the position of the iris of the eye in the face image, for example, and outputs the detected visual line information indicating the driver P's visual line to the outside. The control unit 22 detects the position of the driver P's pupils using well-known image processing such as pattern matching of images. The control unit 22 compares, for example, a predetermined eye image with the face image of the driver P captured by the camera 11, and detects the position of the driver P's pupils in the face image of the driver P. The control unit 22 detects the driver P's visual line from the detected position of the driver P's pupils. The control unit 22 is connected to, for example, a warning device or the like that detects drowsiness of the driver P and warns him or her, and outputs the detection results of the visual line to the warning device.

The control unit 22 has a wearing determination function of determining whether the driver P wears polarized sunglasses, based on the face image acquired by the camera 11. The control unit 22 has a calculation unit 25, a determination unit 26, and a storage unit 27 as configurations corresponding to the wearing determination function.

The calculation unit 25 has a function of calculating a luminance value corresponding to each face image on the basis of a plurality of face images continuously acquired by the camera 11, and storing the calculated luminance values in the storage unit 27 as luminance value information in association with a time series. The calculation unit 25 performs image processing using a known method to calculate the luminance value of each face image. The calculation unit 25 stores the calculated luminance values in the storage unit 27 as the luminance value information together with time information indicating the time when the face image was photographed. The luminance value information includes at least time information indicating the time when the face image was photographed and the luminance value of the face image. The storage unit 27 stores a plurality of pieces of luminance value information therein.

The determination unit 26 has a function of comparing the current luminance value information with the past luminance value information in the pieces of luminance value information stored in the storage unit 27, and determining that the driver P puts on the polarized sunglasses when the current luminance value information decreases. Specifically, the determination unit 26 compares the current luminance value corresponding to the current luminance value information and the old luminance value corresponding to the past luminance value information in the pieces of luminance value information stored in the storage unit 27, and determines that the driver P puts on the polarized sunglasses when the current luminance value becomes smaller than the old luminance value. The current luminance value is the luminance value corresponding to the face image whose time information included in each luminance value information is the latest in the pieces of luminance value information stored in the storage unit 27. The old luminance value is the luminance value corresponding to the face image whose time information included in each luminance value information is at least immediately before the current luminance value information in the pieces of luminance value information stored in the storage unit 27.

Figure 3:
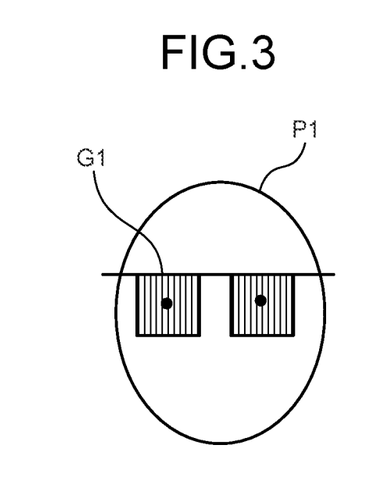
FIG. 3 is a schematic diagram illustrating an example of a face image of a driver P1.
Figure 4:
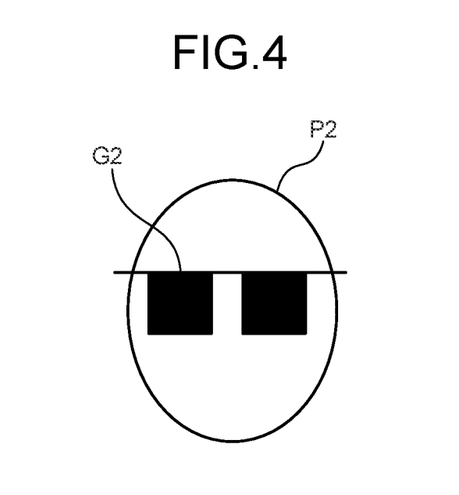
FIG. 4 is a schematic diagram illustrating an example of a face image of a driver P2.

The determination unit 26 compares the current luminance value with the old luminance value and determines that the driver P puts on the polarized sunglasses when the current luminance value becomes smaller than the old luminance value. The driver P's face is generally illuminated with sunlight, illumination light from around the vehicle, illumination light for a driver monitor, or the like. The polarized sunglasses are typically polarized in the vertical direction. The polarizing direction of the polarized sunglasses is normally the vertical direction. Therefore, when the driver P wears the polarized sunglasses, only the longitudinally polarized light of the reflection light of the polarized sunglasses transmits and the light that is observed has lower luminance because of the transmissivity of the polarized sunglasses. In the case of disposing the polarizer 30 in front of the lens 12 of the camera 11 so that the polarizing direction becomes the horizontal direction that is orthogonal to the vertical direction, in the face image of the driver P2 who wears polarized sunglasses G2 that is acquired by the camera 11, the luminance of a lens part of the polarized sunglasses G2 decreases as illustrated in FIG. 4. In other words, when the driver P2 wears the polarized sunglasses G2, it becomes difficult to detect the visual line of the driver P2 from the face image acquired by the camera 11 in accordance with a known method. On the other hand, when the polarizer 30 is disposed so that the polarization direction becomes the vertical direction, the luminance of a lens part of polarized sunglasses G1 in the face image acquired by the camera 11 hardly decreases as illustrated in FIG. 3. Therefore, even when the driver P1 wears the polarized sunglasses G1, it is possible to detect the visual line of the driver P1 from the face image acquired by the camera 11 in accordance with a known method.

The storage unit 27 is a storage circuit or a memory that stores various kinds of data (information) therein. The storage unit 27 stores computer programs for the control unit 22 to implement various functions therein. The storage unit 27 has a storage capacity capable of storing a plurality of pieces of luminance value information corresponding to a plurality of face images acquired when the camera 11 photographs for a certain period of time. With respect to the pieces of luminance value information stored in the storage unit 27, the past luminance value information is erased from the storage unit 27 in order on the basis of the time information contained in each luminance value information, for example.

Figure 5:
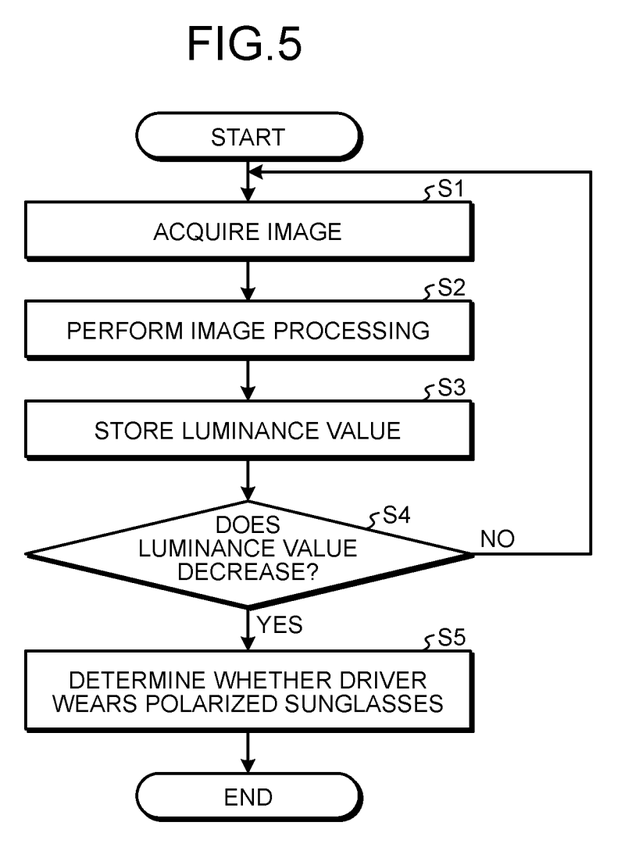
FIG. 5 is a flowchart expressing a procedure of a polarized sunglasses wearing determination process implemented by a control unit in the first embodiment.

Next, with reference to FIG. 5, a polarized sunglasses wearing determination process in the first embodiment will be described.

At step S1, the camera 11 photographs the face region including the face of the driver P and acquires the photographed face image. The camera 11 outputs one frame of the acquired face image to the control unit 22.

At step S2, the control unit 22 causes the calculation unit 25 to perform image processing on the basis of the face image output from the camera 11. The control unit 22 performs face detection using a known method to extract the face region including the face from one frame of two-dimensional image data. The control unit 22 detects eye regions from the face region using the above-mentioned known method and calculates luminance values in the detected eye regions.

At step S3, the control unit 22 causes the storage unit 27 to store therein the luminance value calculated at step S2 by the calculation unit 25 as the luminance value information together with the time information indicating the time when the face image was photographed.

At step S4, the control unit 22 causes the determination unit 26 to compare the current luminance value information with the past luminance value information in the pieces of luminance value information stored in the storage unit 27, and determine whether the current luminance value information decreases. Specifically, the control unit 22 compares the current luminance value corresponding to the current luminance value information with the old luminance value corresponding to the past luminance value information in the pieces of luminance value information stored in the storage unit 27, and determines whether the current luminance value becomes smaller than the old luminance value. If the driver P does not wear the polarized sunglasses, the current luminance value does not decrease relative to the old luminance value when the current luminance value is compared with the old luminance value. On the other hand, when the driver P wear the polarized sunglasses, the current luminance value decreases relative to the old luminance value. If it is determined that the luminance value does not decrease, the process returns to step S1. On the other hand, if it is determined that the luminance value decreases, the process advances to step S5.

At step S5, the control unit 22 causes the determination unit 26 to determine that the driver P puts on the polarized sunglasses and outputs a result of the determination to the outside, and ends this process.

As described above, the vehicle display device 1 according to the first embodiment includes the polarizer 30 that is disposed in front of the lens 12 of the camera 11 that continuously acquires the face images of the driver P so that the polarization direction becomes the horizontal direction that is orthogonal to the vertical direction. In the vehicle display device 1, the control unit 22 calculates the luminance value corresponding to each face image, and causes the storage unit 27 to store the calculated luminance values therein as the luminance value information in association with a time series. The control unit 22 then compares the current luminance value information with the past luminance value information in the pieces of luminance value information stored in the storage unit 27 and when the current luminance value information decreases, determines that the driver P puts on the polarized sunglasses.

With the above configuration, for example, when the driver P puts on the polarized sunglasses in the middle of driving, the current luminance value information decreases relative to the past luminance value information, making it easy to determine that the driver P puts on the polarized sunglasses. For example, once it is found that the driver P puts on the polarized sunglasses, the visibility of the display image can be increased by increasing the luminance of the display image by the projection unit 21 or by changing the polarization angle of the display light. This improves the merchantability of the vehicle display device.

Second Embodiment

Figure 6:
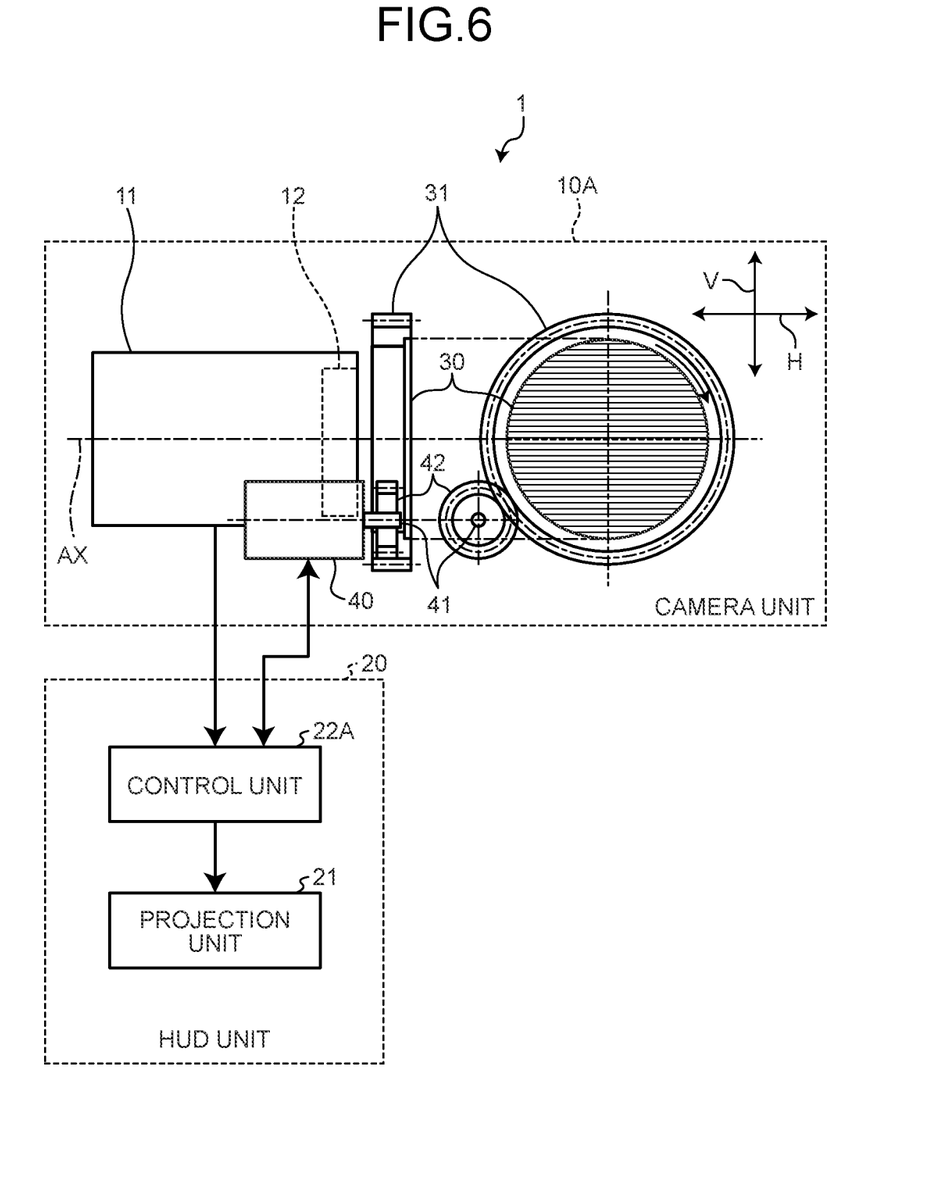
FIG. 6 is a block diagram illustrating an example of a structure of a vehicle display device according to a second embodiment.

A vehicle display device 1A according to a second embodiment differs from the first embodiment in that the polarizer 30 rotates about the optical axis AX of the lens 12 with respect to the camera 11. The same components as those in the above-mentioned embodiment will be hereinafter denoted with the common reference signs, and redundant explanations of common configurations, actions, and effects will be omitted as much as possible (this similarly applies to the description below).

The vehicle display device 1A according to the second embodiment includes a camera unit 10A illustrated in FIG. 6. The camera unit 10A differs from the camera unit 10 described above in that the camera unit 10A includes a servo motor 40, a motor side gear 42, and a gear unit 31. The other configurations of the camera unit 10A are similar to those of the camera unit 10 described above.

The servo motor 40 is an example of a rotary driving unit that rotatably supports the polarizer 30 about the optical axis AX of the lens 12 of the camera 11 and rotates and drives the polarizer 30 about the optical axis AX. The servo motor 40 is electrically connected to a control unit 22A and is driven based on a drive control signal output from the control unit 22A. The servo motor 40 has a rotary shaft 41 with the motor side gear 42, which is a spur gear, connected to an end part thereof on the polarizer 30 side. When the servo motor 40 is driven, the motor side gear 42 rotates forward or backward around the rotary shaft 41.

The gear unit 31 is a spur gear formed in a cylindrical shape when viewed from the optical axis AX direction, with the polarizer 30 fixed inside. The gear unit 31 is meshed with the motor side gear 42 and rotates about the optical axis AX by rotation of the motor side gear 42. The polarizer 30 is rotated and driven by driving of the servo motor 40 through the motor side gear 42 and the gear unit 31. The motor side gear 42 and the gear unit 31 form a deceleration mechanism of the servo motor 40. The servo motor 40, the rotary shaft 41, the motor side gear 42, and the gear unit 31 form a rotation mechanism that rotates the polarizer 30 about the optical axis AX.

The control unit 22A differs from the control unit 22 described above in that the control unit 22A controls the rotary driving of the servo motor 40. The control unit 22A outputs the drive control signal for the servo motor 40 to control the rotary driving of the servo motor 40. The control unit 22A controls the rotary driving of the servo motor 40 so that the polarization direction of the polarizer 30 becomes the vertical direction, or so that the polarization direction becomes the horizontal direction that is orthogonal to the vertical direction.

Figure 7:
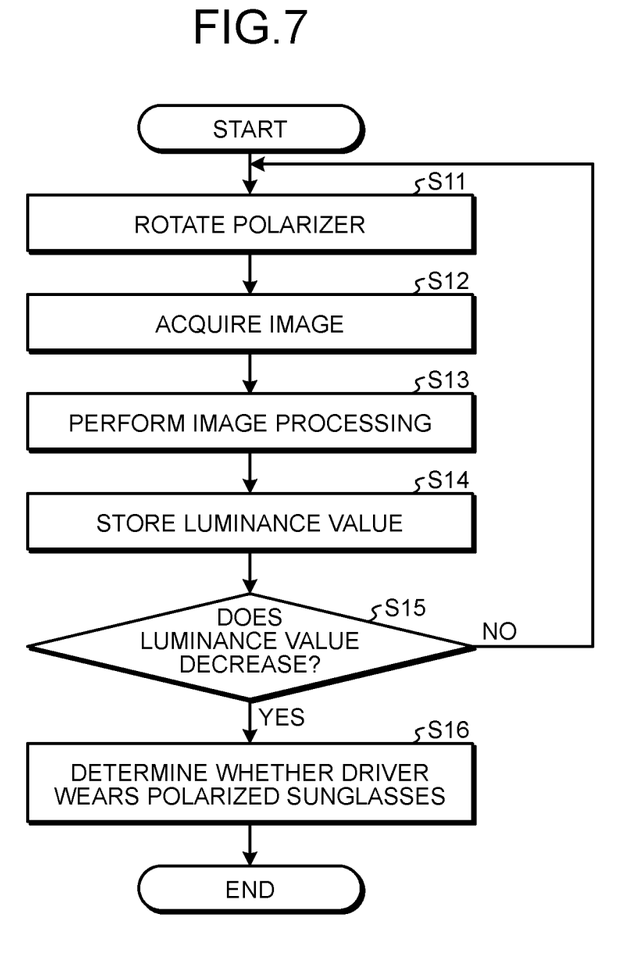
FIG. 7 is a flowchart expressing a procedure of a polarized sunglasses wearing determination process implemented by a control unit in the second embodiment.

Next, with reference to FIG. 7, a polarized sunglasses wearing determination process in the second embodiment is described. Steps S12 to S17 in FIG. 7 are similar to steps S1 to S6 in FIG. 5; therefore, the description thereof is omitted.

At step S11, the control unit 22A controls the rotary driving of the servo motor 40 to rotate the polarizer 30 about the optical axis AX.

At step S12, the camera 11 photographs the face region including the face of the driver P while the polarizer 30 is rotated about the optical axis AX by the rotary driving of the servo motor 40, and thus acquires the photographed face image. The camera 11 outputs one frame of the acquired face image to the control unit 22A. The camera 11 acquires a plurality of face images while the polarizer 30 is rotated once, for example, under the control of the control unit 22A. The control unit 22A controls the photographing timing of the camera 11 and the rotary driving of the polarizer 30 so that the camera 11 acquires the face image at the position where the polarization direction of the polarizer 30 becomes the horizontal direction that is orthogonal to the vertical direction while the polarizer 30 is rotated once.

The control unit 22A causes the camera 11 to photograph the face region including the face of the driver P while the polarizer 30 is rotated about the optical axis AX by the rotary driving of the servo motor 40, and acquire the photographed face image. This makes it possible to acquire the face image even at positions other than the position where the polarization direction of the polarizer 30 becomes the horizontal direction, thus enabling the detection of the visual line of the driver P on the basis of the face image.

As described above, the vehicle display device 1A according to the second embodiment includes the polarizer 30 in front of the lens 12 of the camera 11 that continuously acquires the face images of the driver P. The polarizer 30 is rotated and driven about the optical axis AX by the rotation mechanism including the servo motor 40. In the vehicle display device 1A, the control unit 22A calculates the luminance value corresponding to each face image and causes the storage unit 27 to store therein the calculated luminance value as the luminance value information in association with a time series. The control unit 22A then compares the current luminance value information with the past luminance value information in the pieces of luminance value information stored in the storage unit 27, and when the current luminance value information decreases, determines that the driver P puts on the polarized sunglasses.

With the above configuration, in a manner similar to the first embodiment described above, when the driver P puts on the polarized sunglasses in the middle of driving, the current luminance value information decreases relative to the past luminance value information, making it easy to determine that the driver P puts on the polarized sunglasses. Additionally, it becomes possible to acquire the face image even at the positions other than the position where the polarization direction of the polarizer 30 becomes the horizontal direction, thus enabling the detection of the visual line of the driver P on the basis of the face image.

Third Embodiment

Figure 8:
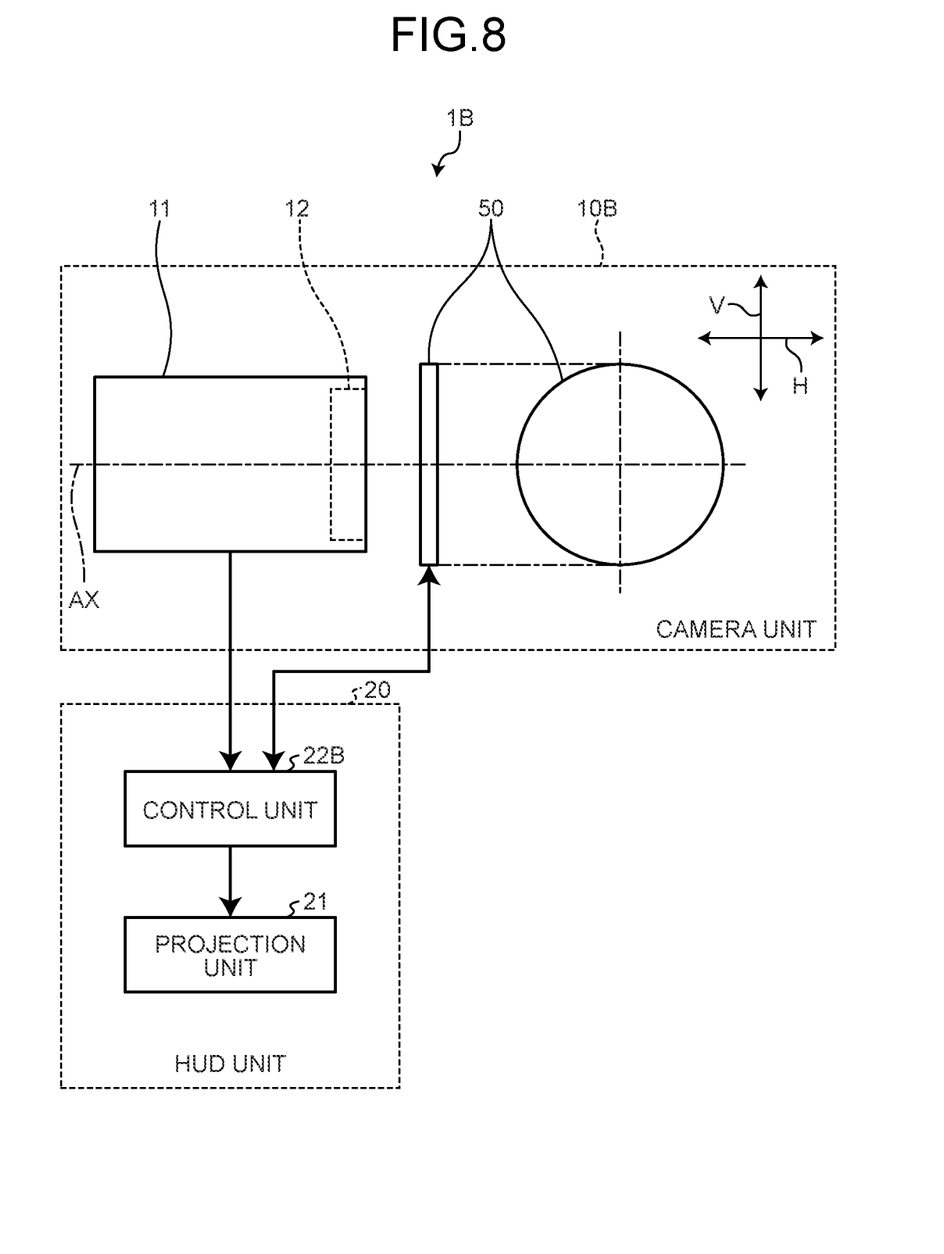
FIG. 8 is a block diagram illustrating an example of a structure of a vehicle display device according to a third embodiment.

A vehicle display device 1B according to a third embodiment differs from the first embodiment described above in that a liquid crystal element 50 is disposed in front of the lens 12 of the camera 11 instead of the polarizer 30.

The vehicle display device 1B according to the third embodiment includes a camera unit 10B illustrated in FIG. 8. The camera unit 10B differs from the camera unit 10 described above in that the camera unit 10B includes the liquid crystal element 50 instead of the polarizer 30. The other configurations of the camera unit 10B are similar to those of the camera unit 10 described above.

The liquid crystal element 50 is disposed in front of the lens 12 of the camera 11 and, in an energized state, converts incident light into linearly polarized light and emits the light toward the camera 11. The liquid crystal element 50 is electrically connected to a control unit 22B and is driven based on the drive control signal output from the control unit 22B, and switches to one of the energized state and the de-energized state. The liquid crystal element 50 includes a polarization plate, which is not illustrated, and is disposed so that the polarization direction of the polarization plate becomes the horizontal direction that is orthogonal to the vertical direction in the energized state.

The control unit 22B differs from the control unit 22 described above in that the control unit 22B controls driving of the liquid crystal element 50. The control unit 22B outputs the drive control signal for the liquid crystal element 50 to switch the energized state/de-energized state of the liquid crystal element 50. The control unit 22B switches the energized state/de-energized state of the liquid crystal element 50 so that the polarization direction of the liquid crystal element 50 becomes the horizontal direction or the polarization direction becomes other than the horizontal direction.

Figure 9:
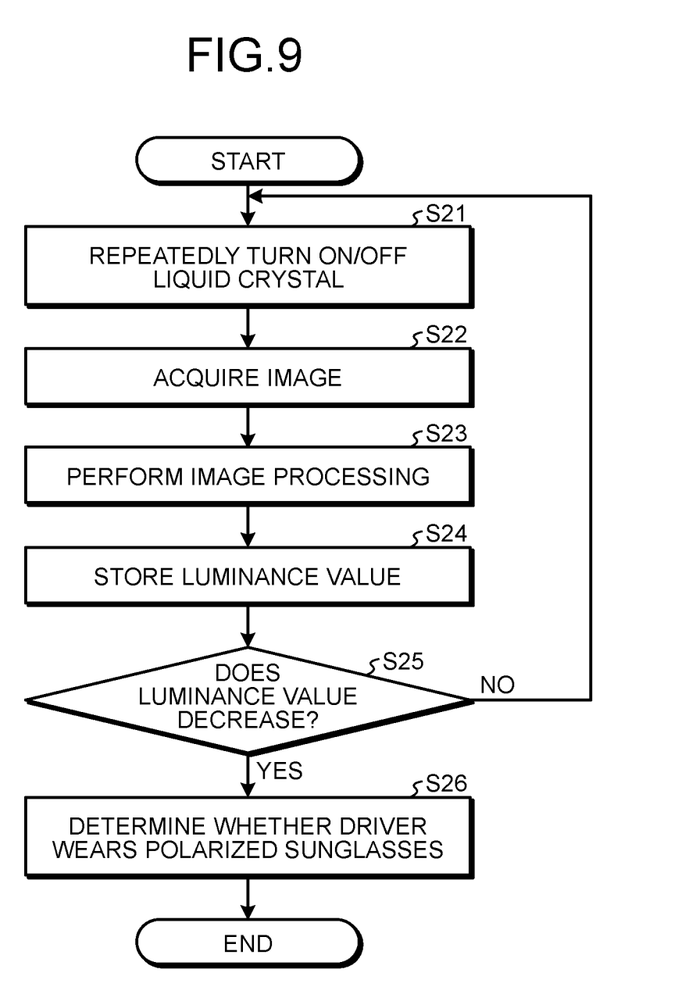
FIG. 9 is a flowchart expressing a procedure of a polarized sunglasses wearing determination process implemented by a control unit in the third embodiment.

Next, with reference to FIG. 9, a polarized sunglasses wearing determination process in the third embodiment is described. Steps S22 to S27 in FIG. 9 are similar to steps S1 to S6 in FIG. 5; therefore, the description thereof is omitted.

At step S21, the control unit 22B controls the driving of the liquid crystal element 50 so as to turn on/off the liquid crystal element 50 repeatedly. Here, when the liquid crystal element 50 is turned on, the energized state is obtained, and when the liquid crystal element 50 is turned off, the de-energized state is obtained.

At step S22, the camera 11 photographs the face region including the face of the driver P with the liquid crystal element 50 being driven on/off, and thus acquires the photographed face image. The camera 11 outputs one frame of the acquired face image to the control unit 22B. The camera 11 acquires the face images while the liquid crystal element 50 is repeatedly turned on/off under the control of the control unit 22B. The control unit 22A controls the driving of the liquid crystal element 50 so that the camera 11 acquires the face images at the position where the polarization direction of the liquid crystal element 50 becomes the horizontal direction and at the positions other than the position where the polarization direction becomes the horizontal direction.

The control unit 22B causes the camera 11 to photograph the face region including the face of the driver P with the liquid crystal element 50 in the de-energized state, and acquire the photographed face image. This makes it possible to acquire the face image even at the positions other than the position where the polarization direction of the liquid crystal element 50 becomes the horizontal direction, thus enabling the detection of the visual line of the driver P on the basis of the face image.

As described above, the vehicle display device 1B according to the third embodiment includes the liquid crystal element 50 that is disposed in front of the lens 12 of the camera 11 that continuously acquires the face images of the driver P so that the polarization direction becomes the horizontal direction that is orthogonal to the vertical direction in the energized state. In the vehicle display device 1B, the control unit 22B calculates the luminance value corresponding to each face image and causes the storage unit 27 to store therein the calculated luminance value as the luminance value information in association with a time series. The control unit 22B then compares the current luminance value information with the past luminance value information in the pieces of luminance value information stored in the storage unit 27, and when the current luminance value information decreases, determines that the driver P puts on the polarized sunglasses.

With the above configuration, in a manner similar to the first embodiment described above, when the driver P puts on the polarized sunglasses in the middle of driving, the current luminance value information decreases relative to the past luminance value information, making it easy to determine that the driver P puts on the polarized sunglasses. Additionally, it becomes possible to acquire the face image even at the positions other than the position where the polarization direction of the polarizer 30 becomes the horizontal direction, thus enabling the detection of the visual line of the driver P on the basis of the face image.

In the second and third embodiments described above, the control unit 22A, 22B compares the current luminance value with the old luminance value and when the current luminance value becomes smaller than the old luminance value, determines that the driver P puts on the polarized sunglasses. When the current luminance value becomes larger than the old luminance value after it is determined that the driver P wears the polarized sunglasses, the control unit 22A, B may determine that the driver P takes off the polarized sunglasses. This makes it easy to determine that the driver P takes off the polarized sunglasses.

Figure 10:
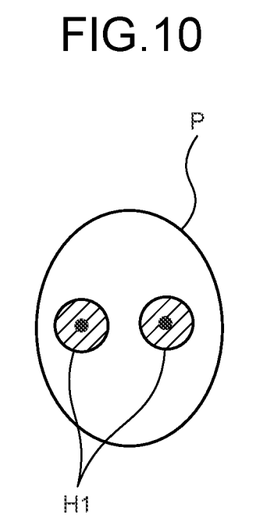
FIG. 10 is a schematic diagram illustrating an example of a determination region used in the polarized sunglasses wearing determination.
Figure 11:
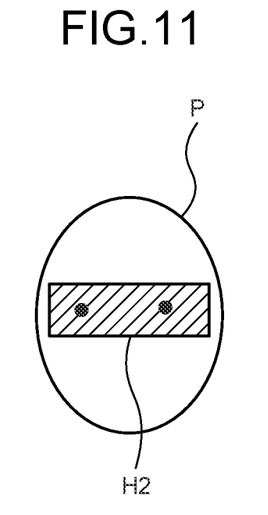
FIG. 11 is a schematic diagram illustrating another example of the determination region used in the polarized sunglasses wearing determination.
Figure 12:
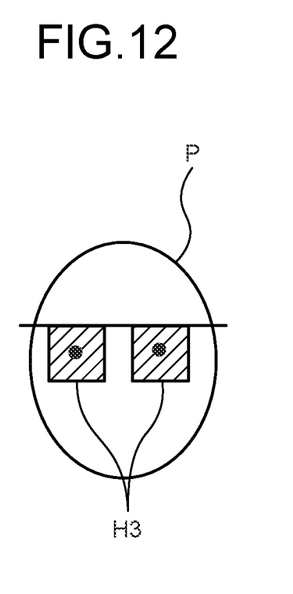
FIG. 12 is a schematic diagram illustrating still another example of the determination region used in the polarized sunglasses wearing determination.

In the first to third embodiments described above, the luminance value corresponding to the face image is calculated. However, since the face image contains the background, etc., other than the driver P, the luminance value corresponding to the face image may change due to sunlight or ambient light, even though the driver P does not wear the polarized sunglasses. Therefore, as illustrated in FIG. 10 to FIG. 12, determination regions (H1, H2, H3) that differ from the eye region may be set and the luminance values corresponding to such determination regions (H1 to H3) may be calculated. For example, the determination region H1 is circular in shape with the driver P's pupil at its center. The diameter of the determination region H1 is preferably set around 30 mm, for example, because the range of eye movement during the driving is generally 30 mm or more. The determination region may be circular like the determination region H1, and additionally, may be rectangular like the determination region H3. Instead of providing the determination region for each eye, one determination region may be provided for both eyes like the determination region H2.

In the first to third embodiments, the determination unit 26 compares the current luminance value with the old luminance value and when the current luminance value becomes smaller than the old luminance value, determines that the driver P puts on the polarized sunglasses. However, in order to prevent wrong determination, the aforementioned determination may be carried out a plurality of times within a set period of time (for example, three seconds) and when the decreased state of the current luminance value continues, the determination unit 26 may determine that the driver P puts on the polarized sunglasses.

The vehicle display device according to the present embodiment has the effect that the driver's state of wearing polarized sunglasses can be easily determined.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
   a camera that continuously acquires face images including a face of a driver of a vehicle;

a polarizer that is disposed in front of a lens of the camera, converts incident light into linearly polarized light, and emits the light toward the camera; and a control unit that determines whether the driver wears polarized sunglasses, based on the acquired face images, wherein the camera acquires the face images in a rotary driving state in which the polarizer is rotated and driven by a rotary driving unit, the control unit includes     a calculation unit that calculates a luminance value corresponding to each of the face images and causes a storage unit to store therein, the calculated luminance value in association with a time series as luminance value information, and     a determination unit that compares current luminance value information with past luminance value information in a plurality of pieces of luminance value information stored in the storage unit, and when the current luminance value information decreases, determines the driver puts on the polarized sunglasses, and the control unit outputs a result of the determination to outside.

2. A vehicle display device according to claim 1, wherein the polarizer is disposed so that a polarization direction becomes a horizontal direction that is orthogonal to a vertical direction.

3. A vehicle display device according to claim 1, further comprising:

a rotary driving unit that rotatably supports the polarizer about an optical axis of the lens of the camera and rotates and drives the polarizer about the optical axis.

4. The vehicle display device according to claim 1, wherein the polarizer is a liquid crystal element, the vehicle display device includes a liquid crystal driving unit that switches the liquid crystal element to one of the energized state and a de-energized state; and the liquid crystal element is disposed so that a polarization direction becomes a horizontal direction that is orthogonal to a vertical direction in the energized state.

5. The vehicle display device according to claim 2, wherein the polarizer is a liquid crystal element, the vehicle display device includes a liquid crystal driving unit that switches the liquid crystal element to one of the energized state and a de-energized state; and the liquid crystal element is disposed so that a polarization direction becomes a horizontal direction that is orthogonal to a vertical direction in the energized state.

6. The vehicle display device according to claim 3, wherein the determination unit compares the current luminance value information with the past luminance value information after determining the driver wears the polarized sunglasses, and when the current luminance value information becomes larger than the past luminance value information, determines the driver takes off the polarized sunglasses.

7. The vehicle display device according to claim 4, wherein the determination unit compares the current luminance value information with the past luminance value information after determining the driver wears the polarized sunglasses, and when the current luminance value information becomes larger than the past luminance value information, determines the driver takes off the polarized sunglasses.

8. The vehicle display device according to claim 5, wherein the determination unit compares the current luminance value information with the past luminance value information after determining the driver wears the polarized sunglasses, and when the current luminance value information becomes larger than the past luminance value information, determines the driver takes off the polarized sunglasses.

\* \* \* \* \*